(12) United States Patent
Herman

(10) Patent No.: US 7,769,502 B2
(45) Date of Patent: Aug. 3, 2010

(54) SURVIVABILITY/ATTACK PLANNING SYSTEM

(75) Inventor: Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1376 days.

(21) Appl. No.: 11/137,915

(22) Filed: May 26, 2005

(65) Prior Publication Data
US 2006/0271245 A1 Nov. 30, 2006

(51) Int. Cl.
*G06F 17/00* (2006.01)
(52) U.S. Cl. ............................... 701/6; 342/45; 342/52; 342/62; 701/3
(58) Field of Classification Search ................... 342/45, 342/52; 340/425.5; 701/1, 3, 6
See application file for complete search history.

(56) References Cited

U.S. PATENT DOCUMENTS

| | | | |
|---|---|---|---|
| 4,979,137 A | 12/1990 | Gerstenfeld et al. | |
| 5,043,903 A | 8/1991 | Constant | |
| 5,508,928 A | 4/1996 | Tran | |
| 5,638,281 A | 6/1997 | Wang | |
| 5,671,140 A | 9/1997 | Bessacini et al. | |
| 5,838,262 A | 11/1998 | Kershner et al. | |
| 6,133,867 A | 10/2000 | Eberwine et al. | |
| 6,161,061 A | 12/2000 | Bessacini et al. | |
| 6,239,740 B1 | 5/2001 | Collins et al. | |
| 6,466,710 B1 * | 10/2002 | Pergande | ...................... 385/15 |
| 6,628,231 B2 | 9/2003 | Mayersak | |
| 6,646,588 B2 * | 11/2003 | Tran | ............................ 342/29 |
| 6,664,915 B1 * | 12/2003 | Britton | .......................... 342/45 |
| 6,668,218 B1 | 12/2003 | Bulow et al. | |
| 6,744,382 B1 | 6/2004 | Lapis et al. | |
| 6,785,610 B2 | 8/2004 | Baker et al. | |
| 6,804,607 B1 | 10/2004 | Wood | |
| 6,822,583 B2 | 11/2004 | Yannone et al. | |
| 6,903,676 B1 * | 6/2005 | Frady et al. | .................... 342/52 |
| 6,995,660 B2 * | 2/2006 | Yannone et al. | ........... 340/425.5 |
| 7,049,998 B1 * | 5/2006 | Frady et al. | .................... 342/52 |
| 7,487,013 B2 * | 2/2009 | Miklos | ........................... 701/3 |
| 7,599,765 B2 * | 10/2009 | Padan | ............................ 701/3 |
| 2004/0068372 A1 | 4/2004 | Ybarra et al. | |
| 2004/0139039 A1 | 7/2004 | Mon | |
| 2005/0082330 A1 * | 4/2005 | Fehlberg et al. | .............. 224/631 |
| 2006/0238403 A1 * | 10/2006 | Golan et al. | ................... 342/62 |
| 2006/0271245 A1 * | 11/2006 | Herman | .......................... 701/1 |
| 2007/0021879 A1 * | 1/2007 | DelNero et al. | ................ 701/23 |
| 2007/0023582 A1 * | 2/2007 | Steele et al. | ................. 244/190 |
| 2007/0180490 A1 * | 8/2007 | Renzi et al. | ..................... 726/1 |
| 2008/0208397 A1 * | 8/2008 | Miklos | ........................... 701/3 |

FOREIGN PATENT DOCUMENTS

| WO | WO9519545 | 7/1995 |
|---|---|---|
| WO | WO9519547 | 7/1995 |

* cited by examiner

*Primary Examiner*—Thomas G Black
*Assistant Examiner*—Wae Louie
(74) *Attorney, Agent, or Firm*—Tarolli, Sundheim, Covell & Tummino LLP

(57) ABSTRACT

A system for suggesting a course of action for a vehicle engaged in a situation includes a portion for identifying condition data that corresponds to conditions sensed from the situation. The system also includes a portion for selecting parameters associated with the condition data. The system further includes a portion for determining a suggested course of action based on the selected parameters.

24 Claims, 12 Drawing Sheets

200

ATTACK VEHICLE WEAPON AVAILABILITY — 60, 204

| ATTACK VEHICLE SENSOR AVAILABILITY | WPN1 | WPN1 | WPN1 | ... |
|---|---|---|---|---|
| FULL SUITE | $LSR_{1,1}$ | $LSR_{1,2}$ | $LSR_{1,3}$ | |
| SENSOR 1 | $LSR_{2,1}$ | $LSR_{2,2}$ | $LSR_{2,3}$ | |
| SENSOR 2 | $LSR_{3,1}$ | $LSR_{3,2}$ | $LSR_{3,3}$ | |
| SENSOR 3 | $LSR_{4,1}$ | $LSR_{4,2}$ | $LSR_{4,3}$ | |
| SENSOR 4 | $LSR_{5,1}$ | $LSR_{5,2}$ | $LSR_{5,3}$ | |
| 202 | | | | |

ATTACK VEHICLE WEAPON AVAILABILITY — 60, 212

0° ASPECT
10° ASPECT
...
340° ASPECT
350° ASPECT

| ATTACK VEHICLE SENSOR AVAILABILITY | WPN1 | WPN2 | WPN3 |
|---|---|---|---|
| FULL SUITE | $LSR_{1,1}$ | $LSR_{1,2}$ | $LSR_{1,3}$ |
| SENSOR 1 | $LSR_{2,1}$ | $LSR_{2,2}$ | $LSR_{2,3}$ |
| SENSOR 2 | $LSR_{3,1}$ | $LSR_{3,2}$ | $LSR_{3,3}$ |
| SENSOR 3 | $LSR_{4,1}$ | $LSR_{4,2}$ | $LSR_{4,3}$ |
| SENSOR 4 | $LSR_{5,1}$ | $LSR_{5,2}$ | $LSR_{5,3}$ |

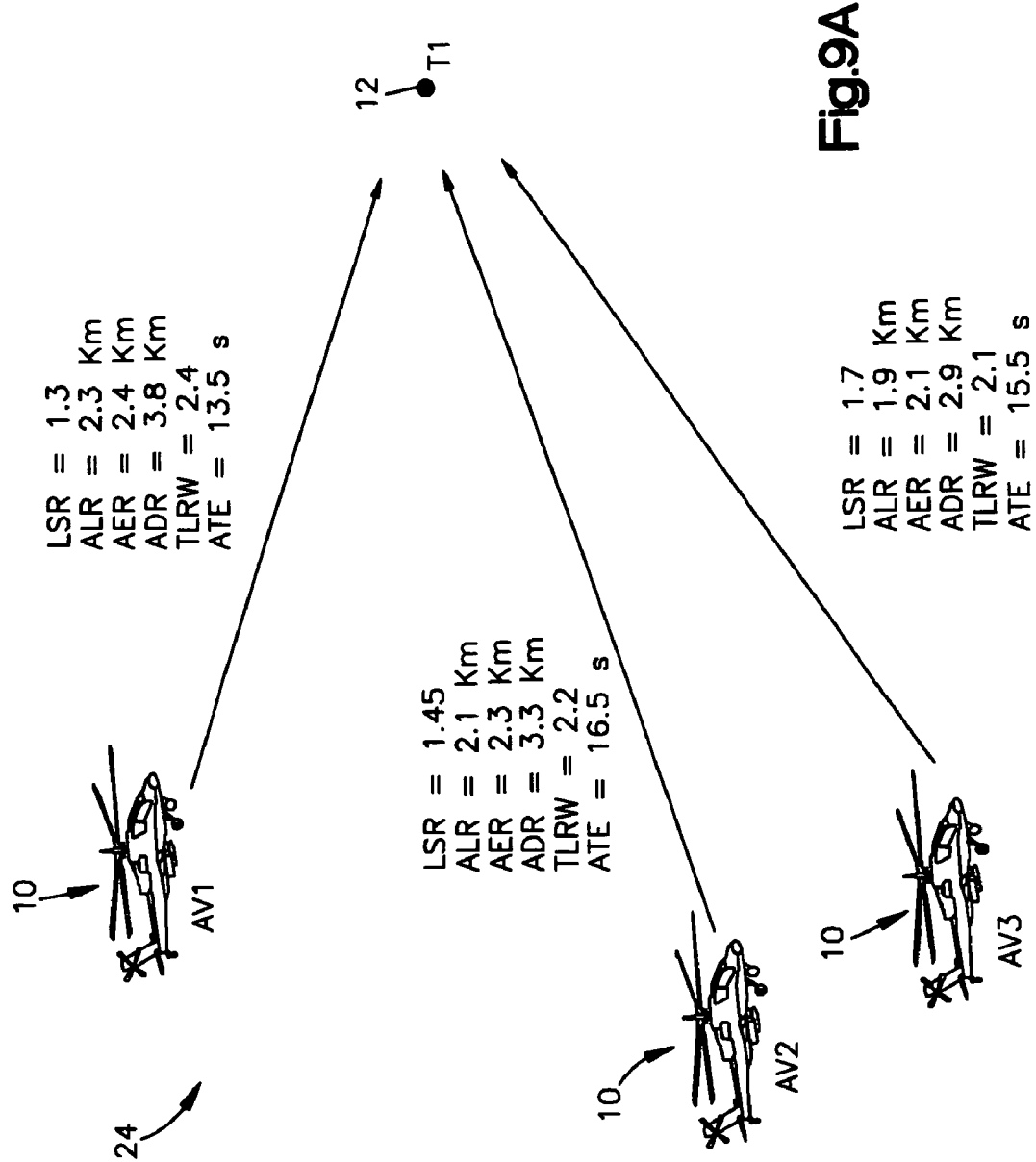

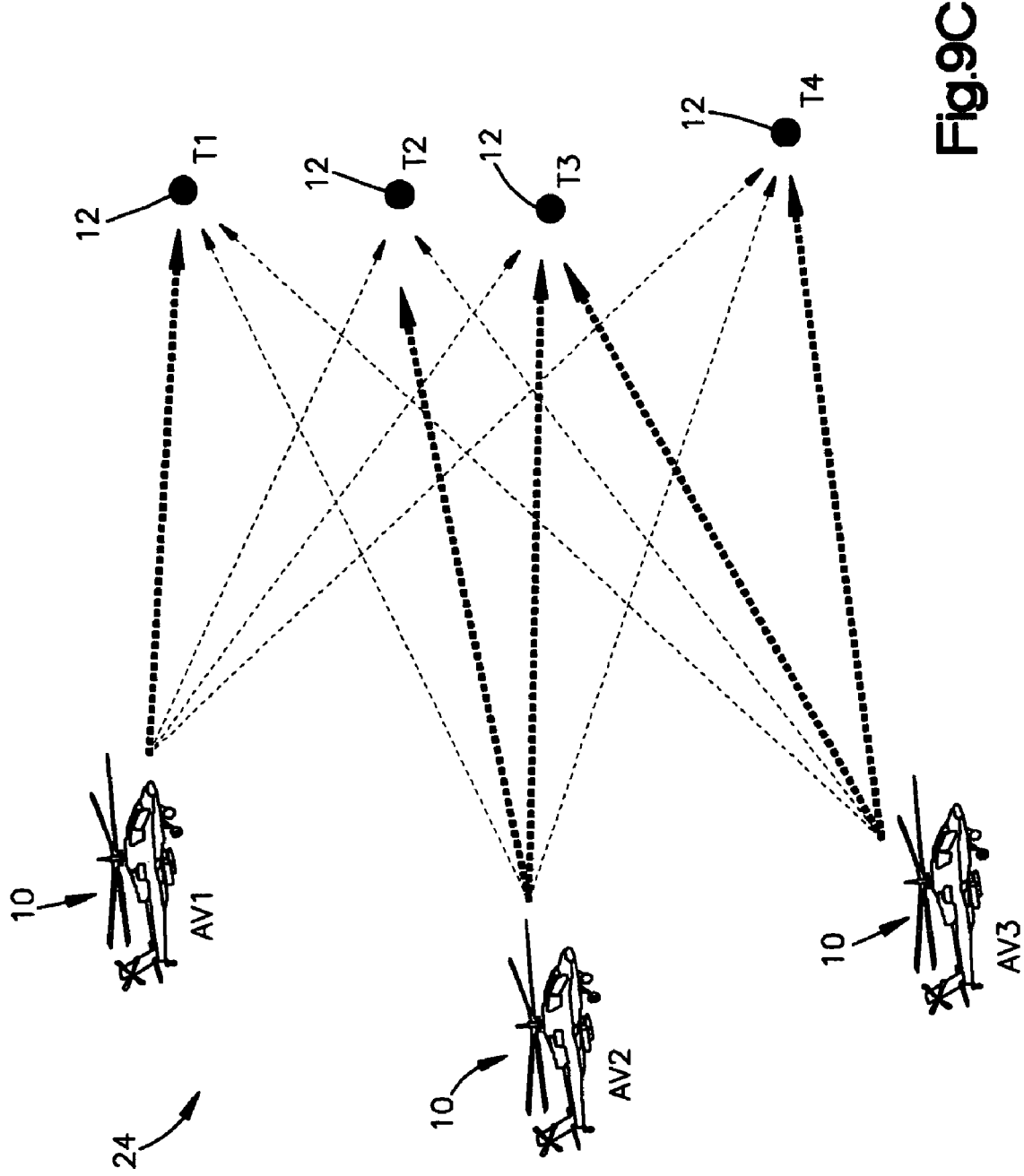

SURVIVABILITY/ATTACK PLANNING SYSTEM

GOVERNMENT RIGHTS

This invention was made with Government support under Agreement No. MDA972-02-9-0011 awarded by DARPA. The Government has certain rights in the invention.

FIELD OF INVENTION

The present invention relates to a planning system for optimizing mission survivability and for maximizing the effectiveness of attacks during the mission. More particularly, the present invention relates to a system for planning a course of action in response to sensed situational conditions by utilizing data derived from stochastic simulation to provide an optimal statistical advantage.

BACKGROUND OF THE INVENTION

There are a variety of vehicles that may encounter targets that pose a threat. In a military or combat setting, these vehicles may be armed, as may be the case with attack vehicles, or unarmed, as may be the case with reconnaissance vehicles. For example, these vehicles may include ground vehicles, such as tanks, armored personnel carriers, or jeeps. As another example, these vehicles may include aircraft, such as jets and propeller driven airplanes or airborne rotocraft, such as helicopters. As a further example, these vehicles may include watercraft, such as gunboats. These vehicles may be manned, for example, by personnel, such as drivers, pilots, or captains. Alternatively, these vehicles may be unmanned vehicles, such as unmanned ground-based vehicles or unmanned aerial vehicles (UAVs). Un-manned vehicles may be controlled by remote operations personnel or may be autonomous, carrying out a mission with little or no human control or intervention.

There are a variety of factors that help determine the actions of a vehicle in response to an encountered target. Examples of these factors include the type or lethality of the target, the lethality of the vehicle against the target, terrain and weather conditions, vehicle speed and altitude, vehicle aspect angles, available vehicle weapon and sensor systems, and target/mission importance. In a manned vehicle or remote operator controlled unmanned vehicle, this determination may be performed through human (e.g., driver or pilot) recognition, sensor recognition (e.g., automatic target recognition (ATR)), or a combination of human recognition and sensor recognition. In an autonomous unmanned vehicle, this determination may be performed solely through sensor recognition. In the case of an attack vehicle, the determined target type and the weapon(s) available to the attack vehicle may also help determine actions of the attack vehicle.

SUMMARY OF THE INVENTION

In accordance with the present invention, a system for suggesting a course of action for a vehicle engaged in a situation includes a portion for identifying condition data that corresponds to conditions sensed from the situation. The system also includes a portion for selecting parameters associated with the condition data. The system further includes a portion for determining a suggested course of action based on the selected parameters.

Also, in accordance with the present invention, a computer program product for suggesting a course of action for a vehicle engaged in a situation includes an instruction for identifying condition data that corresponds to conditions sensed from the situation. The computer program product also includes an instruction for selecting parameters associated with the condition data. The computer program product further includes an instruction for determining a suggested course of action based on the selected parameters.

Further, in accordance with the present invention, a system determines a course of action for an autonomous unmanned attack vehicle engaging a target. The system includes a portion for identifying the target. The system also includes a portion for determining whether the attack vehicle is within the average lethality range of the target. The system further includes a portion for determining the course of action for the attack vehicle in response to a determination of an average lethality range of the target versus the attack vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIGS. 6A-6D are tables illustrating behavioral logic implemented in the example embodiment of the course of action suggesting system;

FIGS. 9A-9C illustrate example engagement scenarios for which the system may suggest a course of action.

DESCRIPTION OF AN EXAMPLE EMBODIMENT

Figure 1:
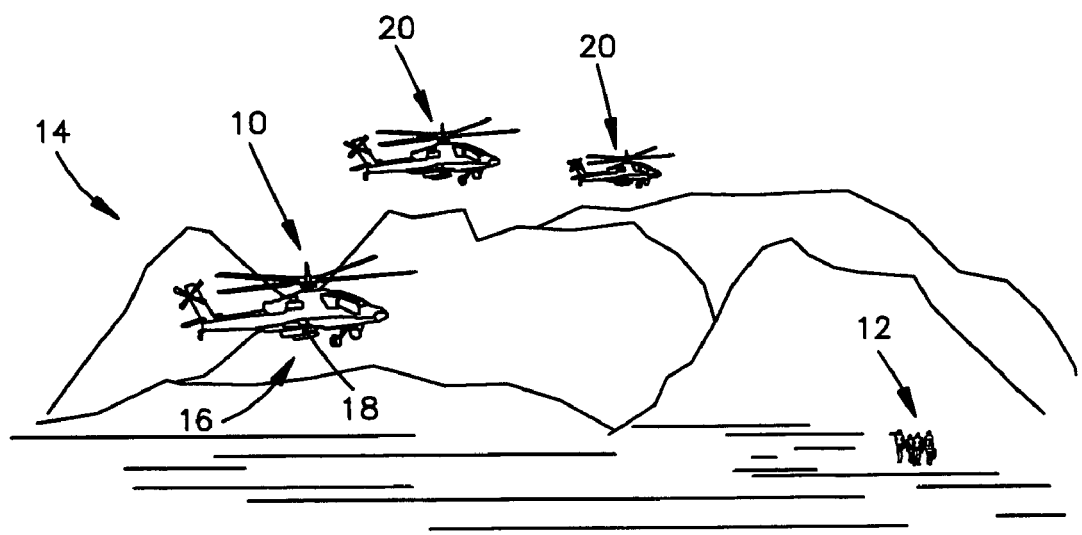
FIG. 1 illustrates an engagement situation including a target and an attack vehicle equipped with a system for suggesting a course of action according to the present invention.

Referring to FIG. 1, the present invention relates to vehicles 10 that engage targets 12 in a situation 14, such as a battlefield engagement scenario. The vehicles 10 may be any known vehicle, military or civilian, manned or unmanned, armed or un-armed. In the example embodiment of FIG. 1, the vehicle 10 is an armed military attack vehicle in the form of an attack helicopter. The targets 12 may be any known target, such as enemy artillery, vehicles, ground troops or a combination of these enemy targets. In the illustration of FIG. 1, the targets 12 are ground troops. The attack vehicle 10 is fit with a weapon system 16 operative to help control release of one or more weapons 18, such as guns, rockets, or bombs. There may also be friendly entities 20, such as vehicles or troops, in the situation 14. In the situation of FIG. 1, there are two friendly entities 20 in the form of helicopters.

For a given weapon system 16, there is a finite range within which that particular weapon type, on average, is lethal against a particular target 12, i.e., an average lethality range (ALR). For example, where the weapon system 16 is a gun 18, the ALR may be several hundred meters. As another example, where the weapon 18 is a rocket launcher, the ALR may be several kilometers. The type of target 12 may also have some bearing on the ALR for a particular weapon system 16. For example, where the weapon 18 is a gun and the target 12 is an armored vehicle, the gun may be less effective, effective only within close range, or ineffective.

Figure 2:
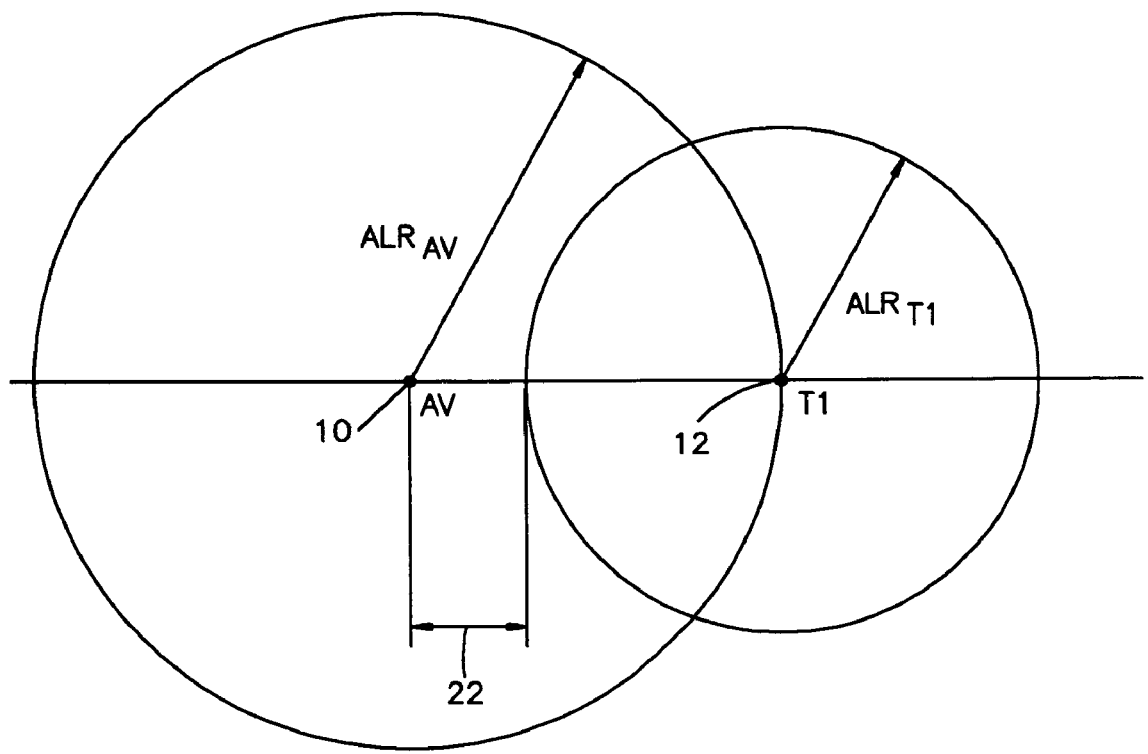
FIG. 2 is a schematic representation of relative positions and average lethality ranges for the target and attack vehicles of FIG. 1.

Referring to FIG. 2, for a given target 12, indicated at T1, there is an average lethality range ($ALR_{T1}$). The average lethality range $ALR_{T1}$ is the average range within which the target 12 is likely to be lethal against a particular attack vehicle 10. Also, for a given attack vehicle 10, there is an average lethality range ($ALR_{AV}$). The average lethality range $ALR_{AV}$ is the average range within which the attack vehicle 10 is likely to be lethal against a particular target 12. Together, the average lethality ranges $ALR_{AV}$ and $ALR_{T1}$ define a lethality standoff margin 22.

The lethality standoff margin 22 is related to a lethality standoff ratio (LSR) for the attack vehicle 10 versus the target 12. The lethality standoff ratio can be expressed in terms of the average lethality ranges of the attack vehicle 10 and the target 12, $ALR_{AV}$ and $ALR_{T1}$, respectively, according to the following equation:

$$LSR_{AV-T1} = \frac{ALR_{AV}}{ALR_{T1}} \qquad \text{Equation 1}$$

As shown in Equation 1, if the lethality standoff ratio $LSR_{AV-T1}$ is greater than one, the attack vehicle 10 has an overall engagement advantage against the target 12. As the degree to which the lethality standoff ratio $LSR_{AV-T1}$ increases beyond one, the advantage the attack vehicle 10 has against the target 12 also increases. Conversely, if the lethality standoff ratio $LSR_{AV-T1}$ is less than one, the attack vehicle 10 has an overall engagement disadvantage against the target 12. As the lethality standoff ratio $LSR_{AV-T1}$ approaches zero, the overall engagement disadvantage of the attack vehicle 10 increases.

Figure 3:
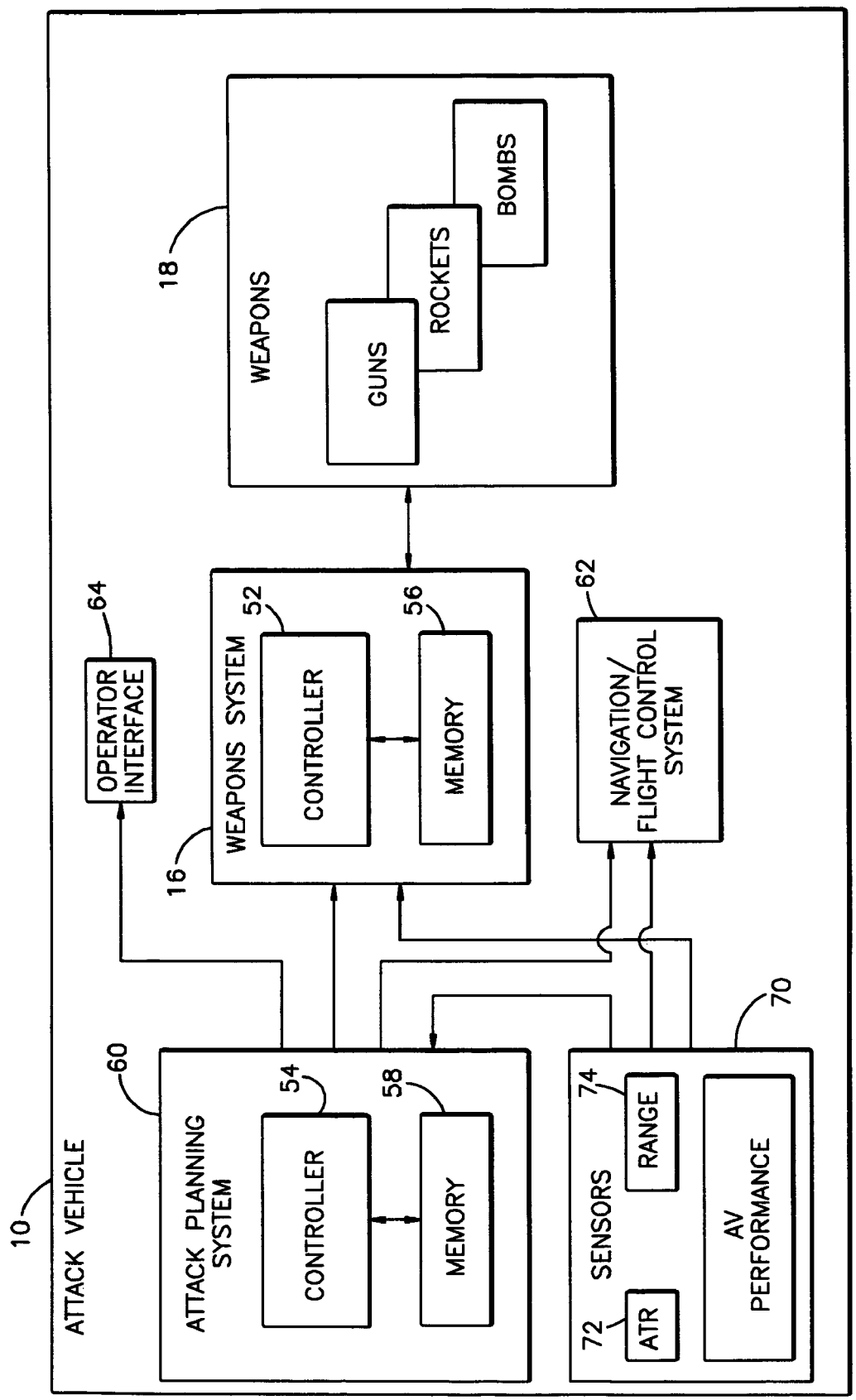
FIG. 3 is a schematic representation of attack vehicle systems including the course of action suggesting system according to the present invention.

Referring to FIG. 3, the attack vehicle 10 includes a variety of on-board systems. Among these systems are the weapons system 16, an attack planning system 60, and sensors 70. The weapons system 16 is operative to help control operations of the weapons 18 available to the attack vehicle 10. The attack planning system 60 is operative to help determine or suggest a course of action for the attack vehicle 10 based on sensed situational conditions.

The sensors 70 may include one or more target recognition sensors 72, such as an automatic target recognition (ATR). The sensors 70 may also include one or more range sensors 74, such as RADAR or laser radar (LADAR) range sensors. The target recognition sensors 72 and range sensors 74 are operative to provide data relating to target type (e.g., mounted/dismounted or ground troops/vehicle) and range between the attack vehicle 10 and the target 12. The sensors 70 may also include one or more attack vehicle performance sensors 76, such as altitude sensors, speed sensors, and GPS.

Where the attack vehicle 10 is a UAV, the attack planning system 60 may be operative to help actively control a vehicle navigation/flight control system 62. For example, where the attack vehicle 10 is an autonomous airborne UAV, the attack planning system 60 may be operative to help control the flight path of the attack vehicle. Where the attack vehicle 10 is a manned vehicle, the attack planning system 60 may be operative to provide data to an operator of the vehicle through an operator interface 64. For example, where the attack vehicle 10 is a manned rotorcraft, the attack planning system 60 may be operative to provide a suggested flight path on a heads-up display.

In the embodiment of FIG. 3, the weapons system 16 and the attack planning system 60 are illustrated as separate systems implemented on the attack vehicle 10. The weapons system 16 and attack planning system 60 could, however, be implemented on the attack vehicle 10 in any suitable configuration. For example, the weapons system 16 and attack planning system 60 could be components or sub-systems of a single system. The weapons system 16 and attack planning system 60 could themselves comprise one or more components or sub-systems.

The weapons system 16 and attack planning system 60 may be implemented on any suitable platform. The platform upon which the weapons system 16 and attack planning system 60 are implemented may include a variety of computer components, electronic components, or a combination of such components, suited to perform the functions described herein. These components may, for example, include one or more controllers 52, 54 for processing data and one or more memory modules 56, 58 for storing data. The memory modules 56, 58 may include random access memory (RAM), non-volatile random access memory (NVRAM), such as an electronically erasable programmable read only memory (EEPROM), or any other memory or data storage medium. The controllers 52, 54 may include one or more microcontrollers, microprocessors, state machines, discrete components, one or more application specific integrated circuits ("ASIC"), field programmable gate arrays (FPGAs), or a combination of these devices.

The attack planning system 60 may be adapted in any suitable manner to perform the attack planning functions in accordance with the description provided herein. For example, the attack planning system 60 may be configured and adapted to execute an executable computer program product that includes instructions for performing attack planning functions. For instance, referring to the example configuration of FIG. 3, the controller 52 of the attack planning system 60 may execute instructions of a computer program stored in the memory module 56 to perform the desired attack planning functions. In doing so, the controller 52 may utilize data stored in the memory module 56 and information provided by the sensors 70.

According to the present invention, off-line stochastic simulation helps define behavioral logic that is used to make in-mission suggestions or decisions related to mission objectives. For example, the behavioral logic may help make decisions that optimize survivability, attack effectiveness, or both of these objectives. The attack planning system 60 implements the behavioral logic and is thereby responsive to sensed conditions of the situational environment to select the statistically best path along which to engage or avoid a target. According to the present invention, decision points in the behavioral logic of the attack planning system 60 are populated with results from the off-line stochastic simulation. The attack planning system 60 can thus utilize the behavioral logic to make decisions based on real-time data.

Figure 4:
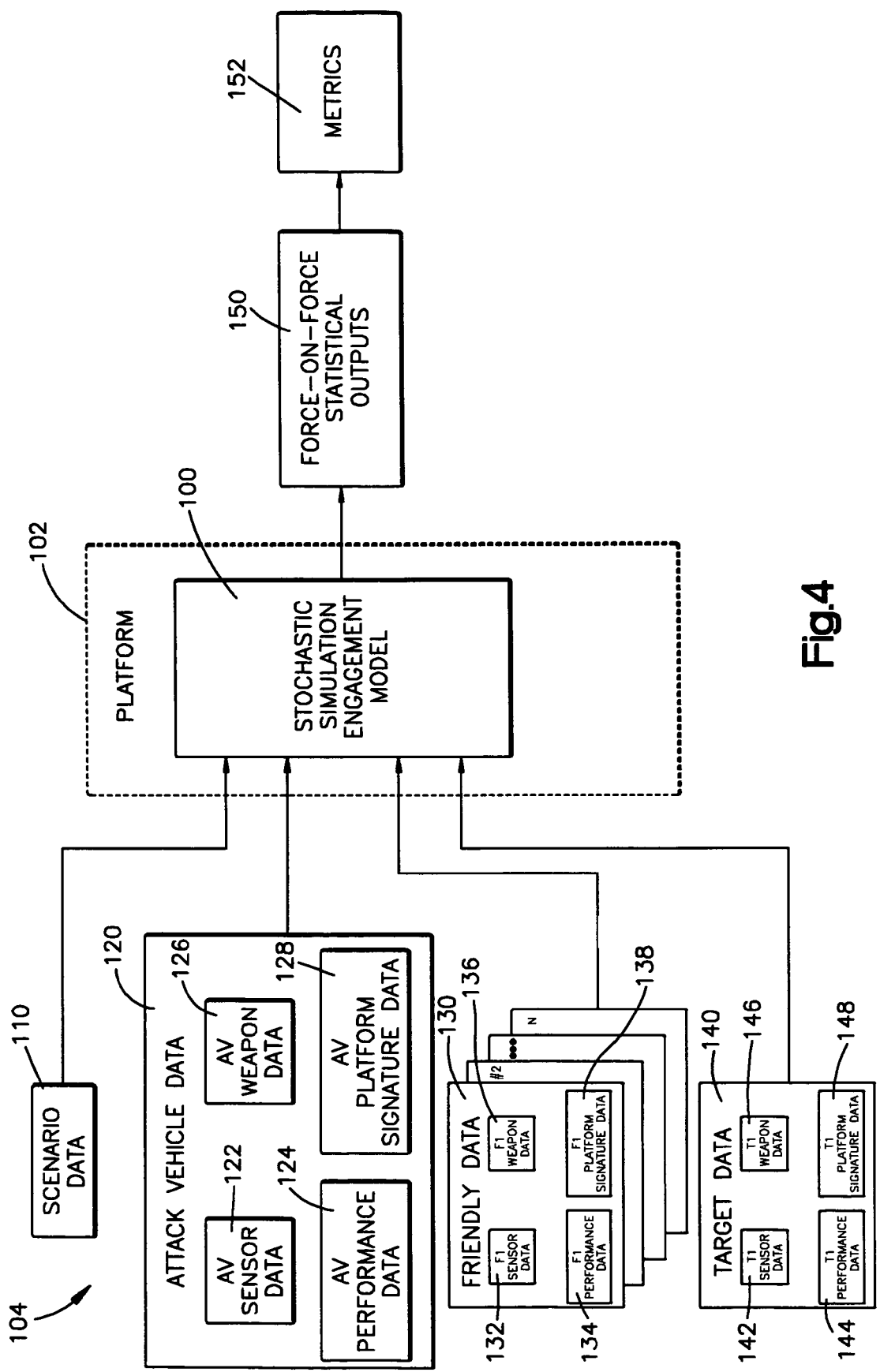
FIG. 4 is a schematic representation of a engagement model used with the course of action suggesting system of the present invention.

Referring to FIG. 4, the off-line stochastic simulation is performed by a stochastic simulation engagement model 100 implemented on a suitable computer platform 102. The engagement model 100 is operative to receive simulation data 104 related to an engagement scenario, such as a battlefield engagement scenario, and perform stochastic simulation based on the data to evaluate possible outcomes of the scenario. The data 104 provided to the engagement model 100 includes scenario data 110 that describes the particular area in which a simulated engagement is to take place. The scenario data 110 may include data related to the terrain, elevation, roads, weather and other environmental conditions and any other condition relevant to a battlefield engagement scenario.

The data 104 also includes vehicle data. In the example embodiment, the vehicle data is attack vehicle data 120. The attack vehicle data 120 includes AV sensor data 122, such as automatic target recognition (ATR) sensor data, available to the attack vehicle 10. ATR data may, for example, be provided by electro-optic sensors, infrared sensors, RADAR, or laser radar (LADAR). The attack vehicle data 120 also includes AV performance data 124, such as speed and altitude data for the attack vehicle 10. The attack vehicle data 120 also includes AV weapon data 126, such as the number and type of weapons available to the attack vehicle 10. The attack vehicle data 120 further includes AV platform signature data 128, such as the radar cross section (RCS), infrared, visual, and acoustic signature given off or emitted from the attack vehicle 10.

The data 104 also includes data 130 for one or more friendly entities. The friendly data 130 includes friendly (F1) sensor data 132, such ATR data, i.e. electro-optic sensor data, infrared sensor data, RADAR data, or laser radar (LADAR) data, that is available to the friendly entity 20. The friendly data 130 also includes F1 performance data 134, such as speed and altitude data for the friendly entity 20. The friendly data 130 also includes F1 weapon data 136, such as the number and type of weapons available to the friendly entity 20. The friendly data 130 further includes F1 platform signature data 138, such as the radar cross section (RCS), infrared, visual, and acoustic signature given off or emitted from the friendly entity 20.

The data 104 also includes data 140 for the target 12. The target data 140 includes T1 sensor data 142, such ATR data, i.e. electro-optic sensor data, infrared sensor data, RADAR data, or laser radar (LADAR) data, that is available to the target 12. The target data 140 also includes T1 performance data 144, such as speed and altitude data for the target 12. The target data 140 also includes T1 weapon data 146, such as the number and type of weapons available to the target 12. The target data 140 further includes T1 platform signature data 148, such as the radar cross section (RCS), infrared, visual, and acoustic signature given off or emitted from the target 12.

Engagement scenarios are defined in the engagement model 100 by the data 104, i.e., the scenario data 110, attack vehicle data 120, target data 140, and any friendly data 130, provided to the model. For each specific engagement scenario defined by the data 104, the engagement model 100 performs multiple, e.g., hundreds, thousands, millions, or more, stochastic simulations to determine force-on-force statistical outputs 150 for the scenario. The statistical outputs 150 are stochastic or probabilistic outcomes for the given engagement scenario. These statistical outputs 150 are used to generate metrics, such as average lethality ranges (ALR) and lethality standoff ratios (LSR) for the attack vehicle 10, target 12, and any friendly entities 20 in the engagement scenario.

Figure 5:
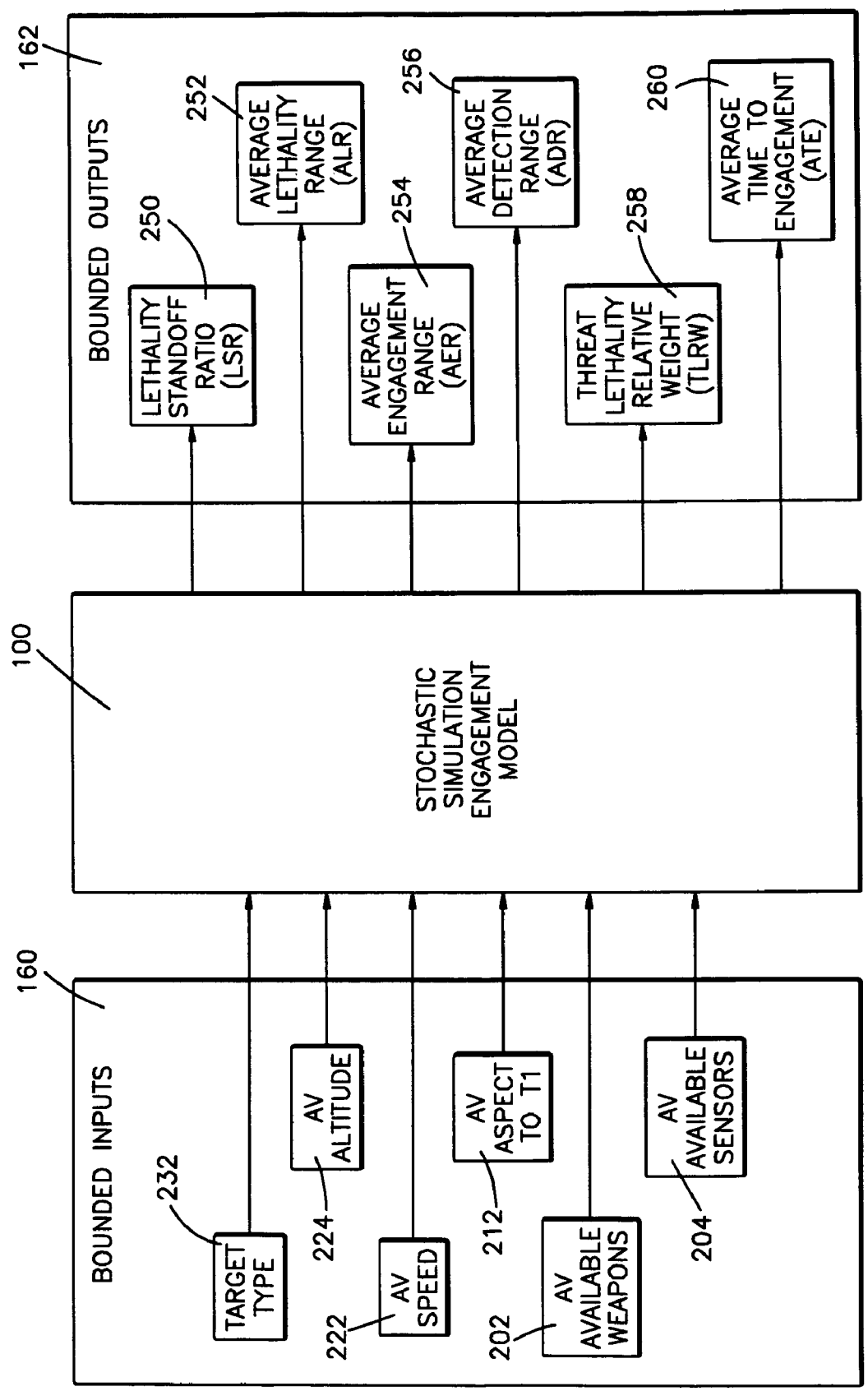
FIG. 5 is a schematic representation of a engagement model used for an example embodiment of the course of action suggesting system of the present invention.

FIG. 5 illustrates one particular example of how the stochastic simulation engagement model 100 may be implemented to determine metrics 152 for use in the attack planning system 60. As shown in FIG. 5, the engagement model 100 is supplied with bounded inputs 160 that the model uses to determine bounded outputs 162. The bounded inputs 160 include target type 232, attack vehicle altitude 224, attack vehicle speed 222, attack vehicle aspect to target 212, attack vehicle weapon 202 availability, and attack vehicle sensor 204 availability. The bounded outputs 162 include lethality standoff ratio (LSR) 250, average lethality ranges (ALR) 252, average engagement ranges (AER) 254, average detection ranges (ADR) 256, target lethality relative weight (TLRW) 258, and average time to engagement (ATE) 260.

The LSR is the ratio of the average lethality ranges $ALR_{T1}$ and $ALR_{AV}$ and thus gives an indication of any overall engagement advantage/disadvantage between the attack vehicle 10 and the target 12. The ALR is the average range at which kills are scored against a specific platform. The AER is the average range at which engagement occurs. The ADR is the average range at which detection of the platform occurs. The TLRW is a measure of the lethality of the target compared to other targets, computed from frequency of engagement and level of damage inflicted. The ATE is the average uninterrupted detection time required for the target 12 to engage the attack vehicle 10.

The engagement model 100 performs multiple iterations (e.g., hundreds, thousands, or more) to simulate the outcome of specific combinations of the bounded inputs 160. For each specific combination of the bounded inputs 160, the engagement model 100 generates metrics 152, based on statistical results of the simulation, that define the bounded outputs 162 corresponding to the input combination. This is repeated for different combinations of the bounded inputs 160, which results in the formation of a table of bounded outputs 162 that helps define the behavioral logic for the attack planning system 60.

It will be appreciated that the bounded outputs 162 determined by the engagement model 100 through stochastic simulation may be customized or otherwise adjusted to account for special engagement scenarios. For example, it may be desirable to customize the bounded LSR 250, ALR 252, and TLRW 258 values using a sensitivity analysis approach for each of the bounded inputs 160. In performing the sensitivity analysis, individual bounded inputs are adjusted an the resulting values for LSR 250, ALR 252, and TLRW 258 are monitored to determine which, if any, of the bounded inputs 160 have a significantly greater impact than others. If such an input is identified, that particular parameter can be given a higher priority during the real-time operation of the attack planning system 60.

As another example, specific engagement scenarios of heightened importance or criticality can be evaluated with a simulation system having a resolution greater than that of the engagement model 100. This may be desirable, for example, in the case of a target type that has particular importance to a mission. The results of this high resolution simulation can be used to adjust the bounded outputs 162 to provide the desired response.

As another example, depending on the specifics of the particular battlefield engagement scenario, there may be an associated risk tolerance, i.e., a degree or amount of risk that the attack vehicle 10 is willing to tolerate. The risk tolerance for a particular attack vehicle 10 in a particular engagement scenario varies, depending on a variety of factors. For example, the risk tolerance may vary depending on the importance or criticality of the mission in which the engagement scenario takes place. As another example, the risk tolerance may vary depending on whether the attack vehicle 10 is manned or unmanned. In a manned attack vehicle 10, the risk of losing on-board human life is involved in determining the risk tolerance. In an unmanned aerial vehicle 10, because on-board human life is not a concern, risk tolerance can become more of a question of the risk of life for other mission team members, impact to mission objectives, and risk of monetary loss. The bounded outputs 160 may be adjusted to take these factors into account.

Figure 6C:
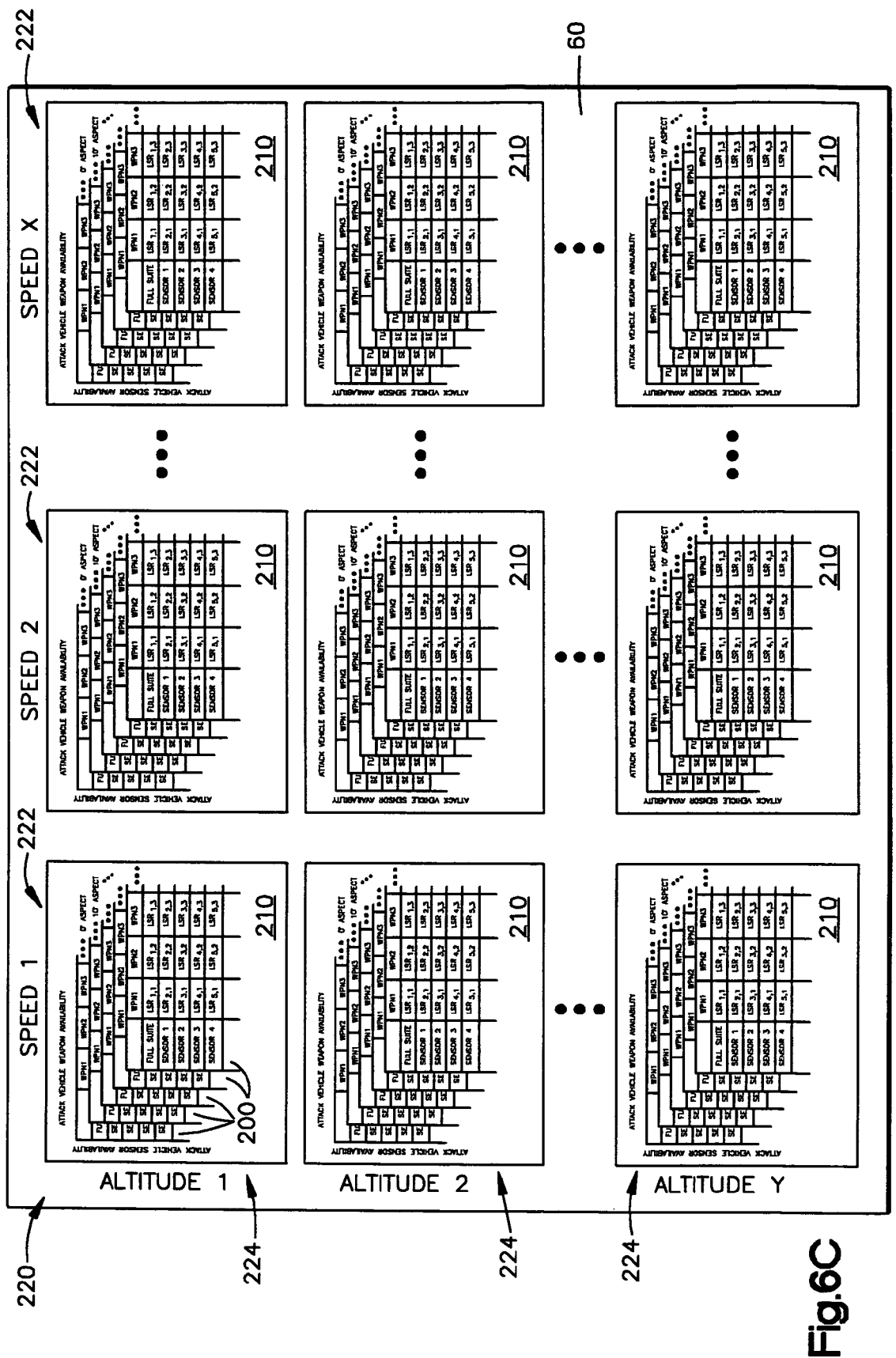
Figure 6D:
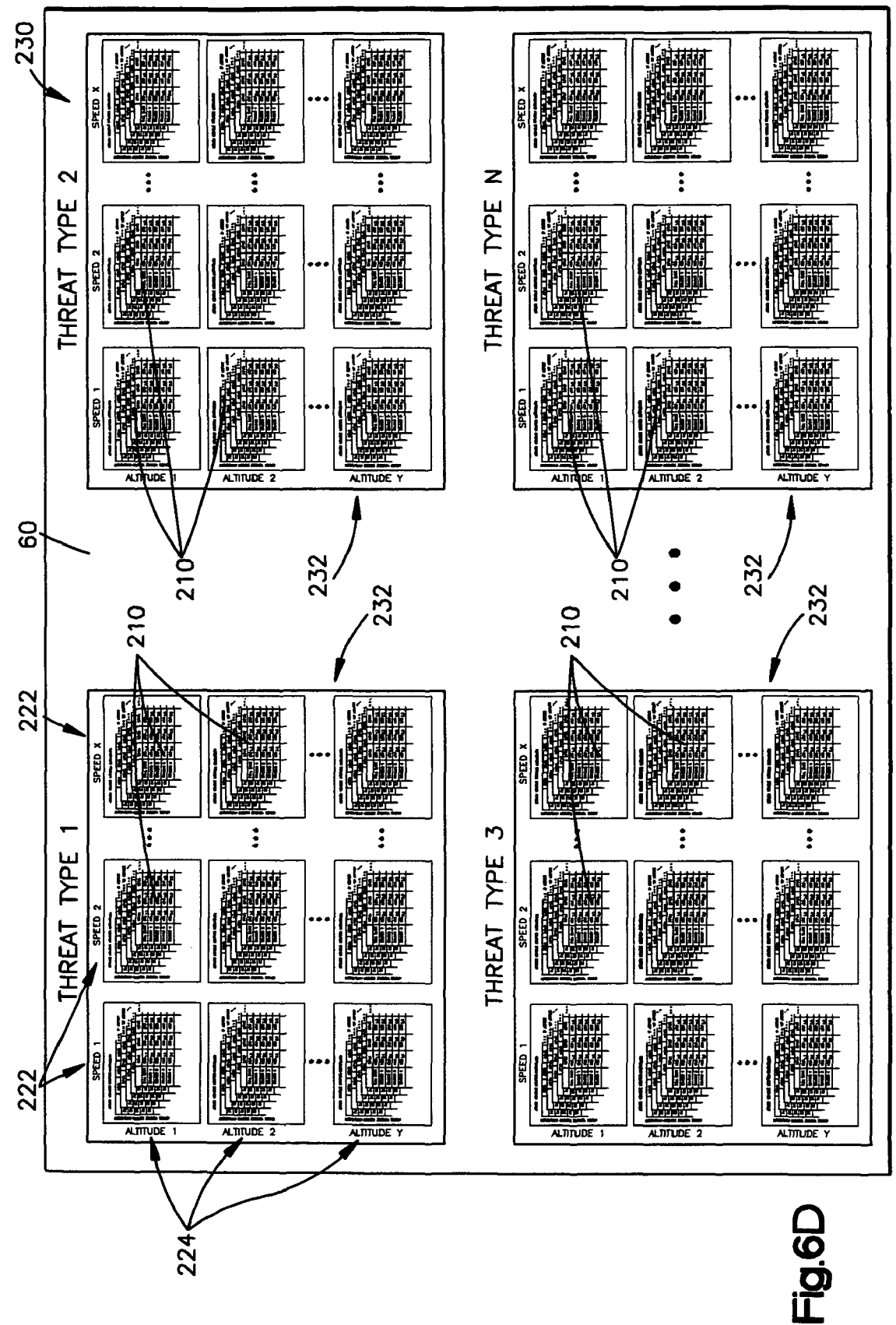

FIGS. 6A-6D illustrate one example of how the bounded outputs 162 generated by the engagement model 100 of FIG. 5 may be implemented to populate decision points in the behavioral logic of the attack planning system 60 of the attack vehicle 10. In the illustrated embodiment, these decisions are made by evaluating one or more databases, which may be in the form of tables or matrices that determine the optimal lethality standoff range (LSR) for a particular engagement scenario. The tables of FIGS. 6A-6D could, however, be used to determine any one or more of the bounded outputs 162 shown in FIG. 5. The tables of FIGS. 6A-6C show the development or evolution of the table of FIG. 6D, which can be used to provide the attack planning system 60 with a multi-dimensional behavioral logic structure. The table structure implemented in the attack planning system 60 may have any number of dimensions. In the embodiment of FIG. 6D, there are six dimensions.

Referring to FIG. 6A, a weapon-sensor table 200 determines LSRs given the weapons 202 and sensors 204 available to the attack vehicle 10. The weapons 202 may include any number of weapons available to the attack vehicle 10, such as guns, rockets, and bombs. The sensors 204 may include any number of sensors available to the attack vehicle 10, such as electro-optic sensors, infrared sensors, radar sensors, and laser sensors. In FIG. 6A, the appropriate LSR can, for example, be selected based on a predefined mission type supplied to the attack planning system 60. As weapons 202 are depleted and sensors 204 are lost or fail, the weapon sensor table 200 allows for the selection of the optimal LSR based on the available weapons 202 and sensors 204.

Referring to FIG. 6B, an aspect angle table 210 adds a dimension related to the aspect angle 212 between the attack vehicle 10 and the target 12. As shown in FIG. 6B, the aspect angle table 210 includes a weapon-sensor table 200 for aspect angles 212 having ten degree increments. It will be appreciated that the aspect angles 212 implemented in the aspect angle table 210 may have a greater or lesser resolution. For example, the resolution of the aspect angles 212 may be in one degree, two degree, five degree, or any other increments. In FIG. 6B, the weapon-sensor table 200 can be selected based on the aspect angle 212 between the attack vehicle 10 and the target 12. The optimal LSR can be determined using the selected weapon-sensor table 200 based on the weapons and sensors available to the attack vehicle 10, as described above.

Referring to FIG. 6C, a speed-altitude table 220 adds dimensions related to the speed 222 and altitude 224 of the attack vehicle 10. As shown in FIG. 6C, the speed-altitude table 220 includes aspect angle tables 210 for speed-altitude combinations for predetermined increments of speed 222 and altitude 224 of the attack vehicle 10. The increments of speed 222 and altitude 224 may have any desired resolution and range.

In FIG. 6C, the appropriate aspect angle table 210 can be selected based on the speed 222 and altitude 224 of the attack vehicle 10. The appropriate weapon-sensor table 200 can be selected based on the aspect angle 212 between the attack vehicle 10 and the target 12. The optimal LSR can be selected based on the weapons and sensors available to the attack vehicle 10, as described above.

Referring to FIG. 6D, a target type table 230 adds a dimension related to the type of target 12 encountered by the attack vehicle 10. As shown in FIG. 6D, the target type table 230 includes speed-altitude tables 220 for different target types 232. The target type table 230 may be adapted to consider any number of target types 232.

In FIG. 6D, the appropriate speed-altitude table 220 can be selected based on the target type 232 encountered by the attack vehicle 10. The appropriate aspect angle table 210 can be selected based on the speed 222 and altitude 224 of the attack vehicle 10. The appropriate weapon-sensor table 200 can be selected based on the aspect angle 212 between the attack vehicle 10 and the target 12. The optimal LSR can be selected based on the weapons and sensors available to the attack vehicle 10, as described above.

The tables of FIGS. 6A-6D may be implemented in the attack planning system 60 to help define the behavioral logic of the system. The attack planning system 60 may dynamically select the optimal values for the LSR 250, ALR 252, AER 254, ADR 256, TLRW 258, and ATE 260 as the target type 232, speed 222, altitude 224, aspect angle 212, weapon 202 availability, and sensor 204 availability changes during the course of the mission. The attack planning system 60 can make these determinations in real-time as the engagement scenario unfolds.

The determinations made by the attack planning system 60 may be used in a variety of manners. For example, in an attack vehicle 10 manned by personnel, an indication of an optimal flight path may be provided as information that the personnel can use along with other information, such as that provided by sensor and visual feedback, to help determine a course of action. As another example, in an unmanned aerial vehicle (UAV) 10, determinations made by the attack planning system 60 may form a portion of a decision-making routine, such as a model, decision table or decision tree, that automatically makes navigational or flight control decisions. As another example, in a UAV 10, determinations made by the attack planning system 60 may be provided as information that remote operations personnel can use to help make makes navigational or flight control decisions for the UAV.

As another example, a best immediate solution (BIS) algorithm may be implemented to perform a multidimensional search for a best recommended path or course of action in a real-time environment. This may be done, for example, by implementing what may be referred to as a "tree-pruning" algorithm. Such algorithms provide an immediate response to a query. Due to the immediacy of the required response, however, the response may be an estimate or approximation. The BIS is the best available response under the time constraints. This may be beneficial in an engagement scenario involving multiple targets, multiple friendly entities, or both.

The suggestions or commands provided by the attack planning system 60 may be made in accordance with tactics, techniques, and procedures (TTP) that correspond a particular target type. Example TTP responses are set forth below in the following Table:

| Target Type | TTP Response |
| --- | --- |
| Type 1 | At low altitude, maintain a distance of $R_{T1}$ meters away from the target. Within $R_{T1}$ meters, maintain an altitude of at least $A_{T1}$ meters. Avoid target envelope semi-spherical distance of $D_{T1}$. If flying directly within target lethality range, maintain a minimum speed of $S_{T2}$ meters/second. |
| Type 2 | At low altitude, maintain a distance of $R_{T2}$ meters away from the target. Within $R_{T2}$ meters, maintain an altitude of at least $A_{T2}$ meters. Avoid target envelope semi-spherical distance of $D_{T2}$. If flying directly within target lethality range, maintain a minimum speed of $S_{T2}$ meters/second. |
| Type 3 | Outside inner-kinematic boundary of weapon, at |

-continued

| Target Type | TTP Response |
|---|---|
| | low altitude, maintain a distance of $R_{T3}$ meters away from the target. Within $R_{T3}$ meters, maintain an altitude of at least $A_{T3}$ meters. Avoid target envelope semi-spherical distance of $D_{T3}$. If flying directly within target lethality range, maintain a minimum speed of $S_{T3}$ meters/second. |
| Type 4 | Maintain a distance of $R_{T4}$ meters away from the target when operating at altitudes above $A1_{T4}$. At distances of $R_{T4}$ meters or closer, maintain an altitude below $A2_{T4}$ meters. If flying directly within target lethality range, maintain a minimum speed of $S_{T4}$ meters/second. |
| Type 5 | Maintain a distance of $R_{T5}$ meters away from the target when operating at altitudes above $A1_{T5}$. At distances of $R_{T5}$ meters or closer, maintain an altitude below $A2_{T5}$ meters. If flying directly within target lethality range, maintain a minimum speed of $S_{T5}$ meters/second. |

Figure 7:
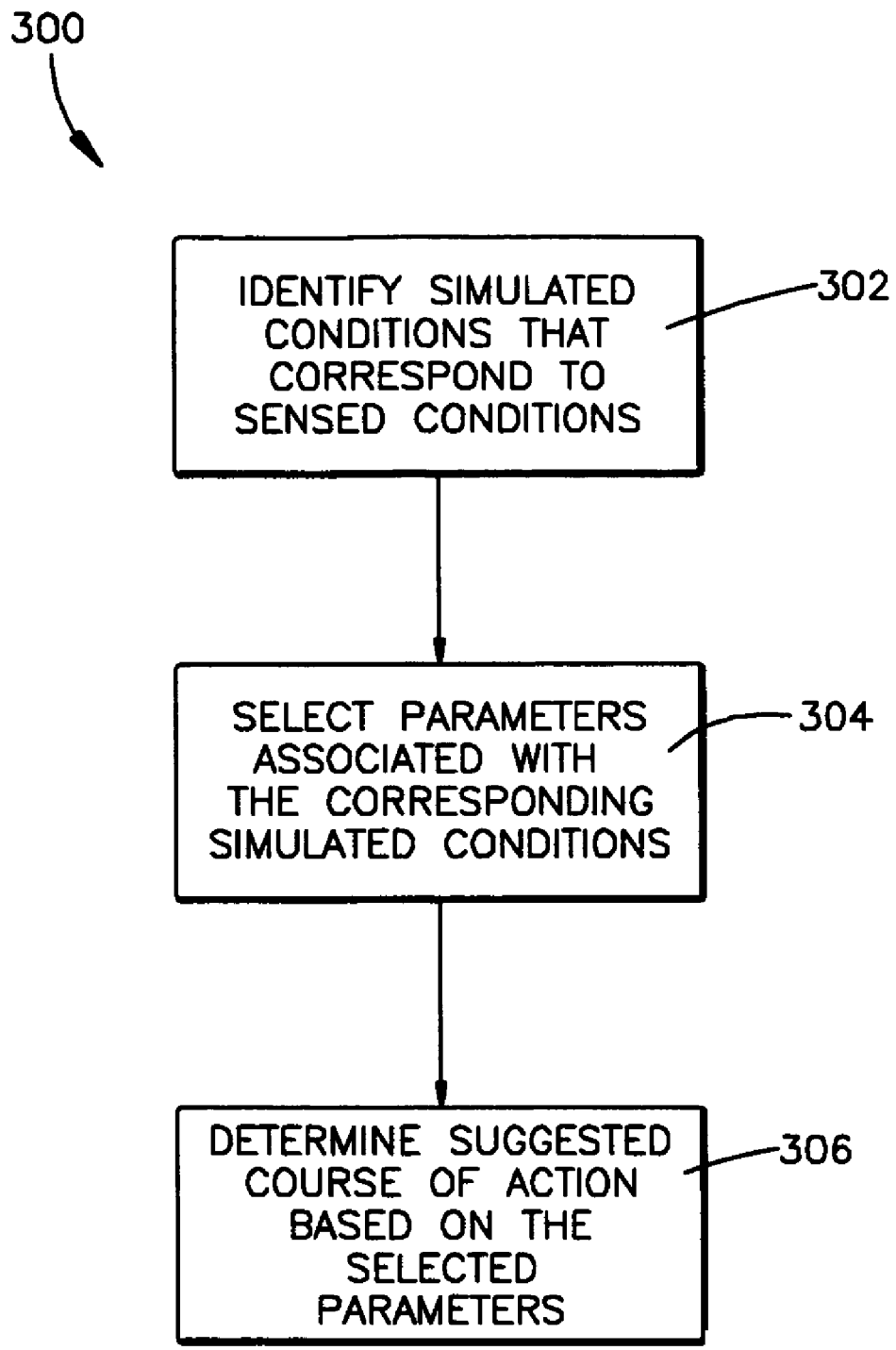
FIGS. 7 and 8 are flow diagrams illustrating processes and computer implemented instructions performed by the course of action suggesting system of FIG. 4.

An example of an attack planning process performed by the attack planning system 60 is illustrated in the diagram of FIG. 7. In this description, the steps or functions of the process illustrated in FIG. 7 are arranged and described in a sequence or order that is not meant to limit the scope of the invention. Certain steps or functions of the process shown in FIG. 7 and described herein may be performed, alone or in part, in any order or simultaneously.

The process 300 includes the step 302 of sensing conditions in the engagement scenario. This may entail sensing conditions, such as threat type and range, via the sensors 70 (see FIG. 3). The process 300 also includes the step 304 of comparing the sensed engagement scenario conditions with data derived from simulation. This may entail looking-up corresponding conditions in the tables of FIGS. 6A-6D. The process 300 further includes the step 306 of determining values for suggesting a course of action for the attack vehicle. This may entail selecting one or more values associated with the corresponding conditions in the table(s).

In the context of the computer executed instructions performed by the attack planning system 60, FIG. 7 also illustrates a computer program product 300. In this context, the blocks in FIG. 7 correspond to computer executed instructions of the computer program product 300. The computer executed instructions of the computer program product 300 perform functions similar or identical to those described above regarding the process of FIG. 7.

As shown in FIG. 7, the computer program product 300 includes an instruction 302 for determining sensed conditions in the engagement scenario. The computer program product 300 also includes an instruction 304 for comparing the sensed engagement scenario conditions with data derived from simulation. The computer program product 300 further includes an instruction 306 for determining values for suggesting a course of action for the attack vehicle.

Figure 8:
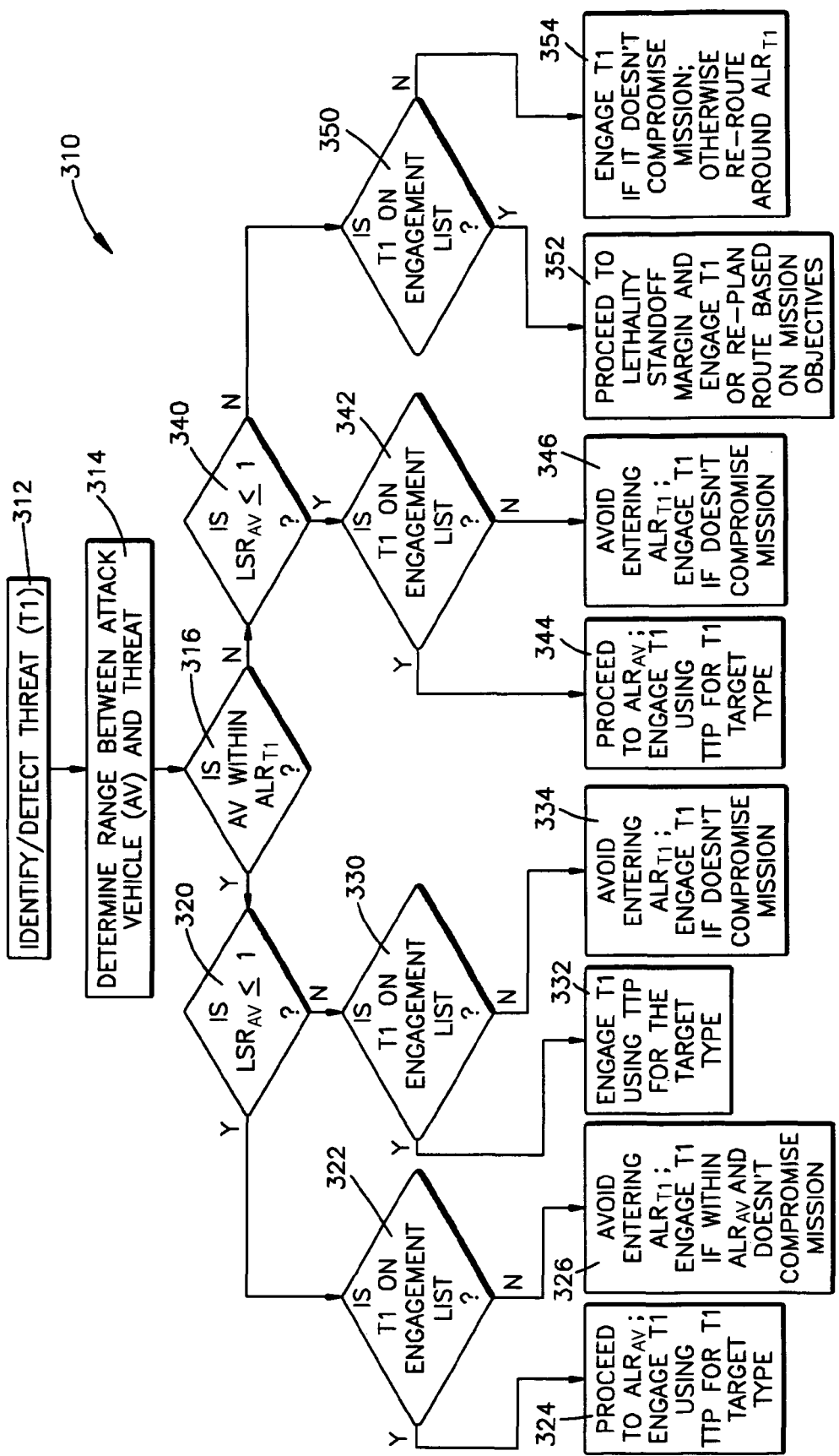

An example of an attack planning process performed by the attack planning system 60 is illustrated in greater detail in the diagram of FIG. 8. In this description, the steps or functions of the process illustrated in FIG. 8 are arranged and described in a sequence or order that is not meant to limit the scope of the invention. Certain steps or functions of the process shown in FIG. 8 and described herein may be performed, alone or in part, in any order or simultaneously.

The process 310 includes the step 312 of identifying or detecting the target (T1) 12. The process 310 also includes the step 314 of determining the range between the attack vehicle (AV) 10 and the detected target 12. The process 310 includes the step 316 of determining whether the attack vehicle 10 is within the average lethality range of the target ($ALR_{T1}$). The determination at step 316 may be made by looking-up the $ALR_{T1}$ for the particular type of target in the data (e.g., the tables of FIGS. 6A-6D) defined by the stochastic simulation engagement model.

If the determination is made that the attack vehicle 10 is within $ALR_{T1}$, an immediate reflexive response is required because the target 12 has the potential of killing the attack vehicle. In this instance, the process 310 includes the step 320 of determining whether the lethality standoff ratio of the attack vehicle ($LSR_{AV}$) greater than one or less than one. The determination at step 320 may be made using the data defined by the stochastic simulation engagement model, given the weapon availability, sensor availability, and aspect angle of the attack vehicle 10 relative to the target 12.

If the determination is made that $LSR_{AV} \geq 1$, the process 310 executes the step 322 of determining whether the target 12 is on the engagement list for the mission. If the target 12 is on the engagement list, at step 324, a suggestion or command is provided to the attack vehicle 10 to proceed to $ALR_{AV}$ and engage the target 12 using the TTP definitions for the target type. If the target 12 is not on the engagement list, at step 326, a suggestion or command is provided to the attack vehicle 10 to avoid entering $ALR_{T1}$ and engage the target 12 if the target is within $ALR_{AV}$ and doing so doesn't compromise the mission.

If, at step 320, the determination is made that $LSR_{AV} > 1$, the process 310 executes the step 330 of determining whether the target 12 is on the engagement list for the mission. If the target 12 is on the engagement list, at step 332, a suggestion or command is provided to the attack vehicle 10 to engage the target 12 using the TTP definitions for the target type. If the target 12 is not on the engagement list, at step 334, a suggestion or command is provided to the attack vehicle 10 to avoid entering $ALR_{T1}$ and engage the target 12 if doing so doesn't compromise the mission.

If, at step 316, the determination is made that the attack vehicle 10 is not within $ALR_{T1}$, a mission management response is in order because the target 12 does not have the potential of killing the attack vehicle. In this instance, the process 310 includes the step 340 of determining whether the lethality standoff ratio of the attack vehicle ($LSR_{AV}$) greater than one or less than one. The determination at step 340 may be made using the data defined by the stochastic simulation engagement model, given the weapon availability, sensor availability, and aspect angle of the attack vehicle 10 relative to the target 12.

If the determination is made that $LSR_{AV} \geq 1$, the process 310 executes the step 342 of determining whether the target 12 is on the engagement list for the mission. If the target 12 is on the engagement list, at step 344, a suggestion or command is provided to the attack vehicle 10 to proceed to $ALR_{AV}$ and engage the target 12 using the TTP definitions for the target type. If the target 12 is not on the engagement list, at step 346, a suggestion or command is provided to the attack vehicle 10 to avoid entering $ALR_{T1}$ if doing so doesn't compromise the mission.

If, at step 340, the determination is made that $LSR_{AV} > 1$, the process 310 executes the step 350 of determining whether the target 12 is on the engagement list for the mission. If the target 12 is on the engagement list, at step 352, a suggestion or command is provided to the attack vehicle 10 to proceed to the lethality standoff margin an engage the target 12 or to re-plan the route based on mission objectives. If the target 12 is not on the engagement list, at step 354, a suggestion or command is provided to the attack vehicle 10 to engage the target 12 if doing so doesn't compromise the mission or, otherwise, to re-route around $ALR_{T1}$.

In the context of the computer executed instructions performed by the attack planning system 60, FIG. 8 also illustrates a computer program product 310. In this context, the blocks in FIG. 8 correspond to computer executed instructions of the computer program product 310. The computer executed instructions of the computer program product 310 perform functions similar or identical to those described above regarding the process of FIG. 8.

As shown in FIG. 8, the computer program product 310 includes an instruction 312 for identifying or detecting the target 12. The computer program product 310 also includes an instruction 314 for determining the range between the attack vehicle 10 and the detected target 12. The computer program product 310 also includes an instruction 316 for determining whether the attack vehicle 10 is within the average lethality range of the target ($ALR_{T1}$). The determination at step 316 may be made by looking-up the $ALR_{T1}$ for the particular type of target in the data defined by the stochastic simulation engagement model.

If the determination is made that the attack vehicle 10 is within $ALR_{T1}$, the computer program product 310 also includes an instruction 320 for determining whether the lethality standoff ratio of the attack vehicle ($LSR_{AV}$) greater than one or less than one. The determination at instruction 320 may be made using the data defined by the stochastic simulation engagement model, given the weapon availability, sensor availability, and aspect angle of the attack vehicle 10 relative to the target 12.

If the determination is made that $LSR_{AV} \geq 1$, an instruction 322 of the computer program product 310 determines whether the target 12 is on the engagement list for the mission. If the target 12 is on the engagement list, an instruction 324 of the computer program product 310 suggests or commands the attack vehicle 10 to proceed to $ALR_{AV}$ and engage the target 12 using the TTP definitions for the target type. If the target 12 is not on the engagement list, an instruction 324 of the computer program product 310 suggests or commands the attack vehicle 10 to avoid entering $ALR_{T1}$ and engage the target 12 if the target is within $ALR_{AV}$ and doing so doesn't compromise the mission.

If, at instruction 320, the determination is made that $LSR_{AV} > 1$, an instruction 330 of the computer program product 310 determines whether the target 12 is on the engagement list for the mission. If the target 12 is on the engagement list, an instruction 332 of the computer program product 310 suggests or commands the attack vehicle 10 to engage the target 12 using the TTP definitions for the target type. If the target 12 is not on the engagement list, an instruction 334 of the computer program product 310 suggests or commands the attack vehicle 10 to avoid entering $ALR_{T1}$ and engage the target 12 if doing so doesn't compromise the mission.

If, at instruction 316, the determination is made that the attack vehicle 10 is not within $ALR_{T1}$, a mission management response is in order because the target 12 does not have the potential of killing the attack vehicle. In this instance, the computer program product 310 includes an instruction 340 of determining whether the lethality standoff ratio of the attack vehicle ($LSR_{AV}$) greater than one or less than one. The determination at instruction 340 may be made using the data defined by the stochastic simulation engagement model, given the weapon availability, sensor availability, and aspect angle of the attack vehicle 10 relative to the target 12.

If the determination is made that $LSR_{AV} \geq 1$, an instruction 342 of the computer program product 310 determines whether the target 12 is on the engagement list for the mission. If the target 12 is on the engagement list, an instruction 344 of the computer program product 310 suggests or commands the attack vehicle 10 to proceed to $ALR_{AV}$ and engage the target 12 using the TTP definitions for the target type. If the target 12 is not on the engagement list, an instruction 346 of the computer program product 310 suggests or commands the attack vehicle 10 to avoid entering $ALR_{T1}$ if doing so doesn't compromise the mission.

If, at instruction 340, the determination is made that $LSR_{AV} > 1$, an instruction 350 of the computer program product 310 determines whether the target 12 is on the engagement list for the mission. If the target 12 is on the engagement list, an instruction 352 of the computer program product 310 suggests or commands the attack vehicle 10 to proceed to the lethality standoff margin an engage the target 12 or to re-plan the route based on mission objectives. If the target 12 is not on the engagement list, an instruction 354 of the computer program product 310 suggests or commands the attack vehicle 10 to engage the target 12 if doing so doesn't compromise the mission or, otherwise, to re-route around $ALR_{T1}$.

As described above, the statistics or metrics derived from the stochastic simulation engagement model 100 may be implemented in the attack planning system 60 to determine a suggested course of action for the attack vehicle 10. The metrics may be implemented to perform or aid in performing a variety of tasks or functions in the attack planning system 60 or other on-board or off-board systems. For example, for a particular engagement scenario, an attack vehicle may be selected from a group or team to engage a particular target based on which attack vehicle has the best LSR against the target. As another example, in an engagement scenario including multiple targets, the metrics may be used to determine suggested flight paths against the targets. As another example, the metrics may be used to calculate and/or maximize team probabilities of success. As another example, the metrics may be used to optimize teaming based on each members probability of success against specific targets. As another example, the metrics may be used to maximize overall lethality while also maximizing overall survivability. As another example, the metrics may be used to perform multi-dimensional cost analysis. As a further example, the average time to engagement may be used for planning approaches that allow for exposure for times less than the average time to engagement.

Figure 9B:
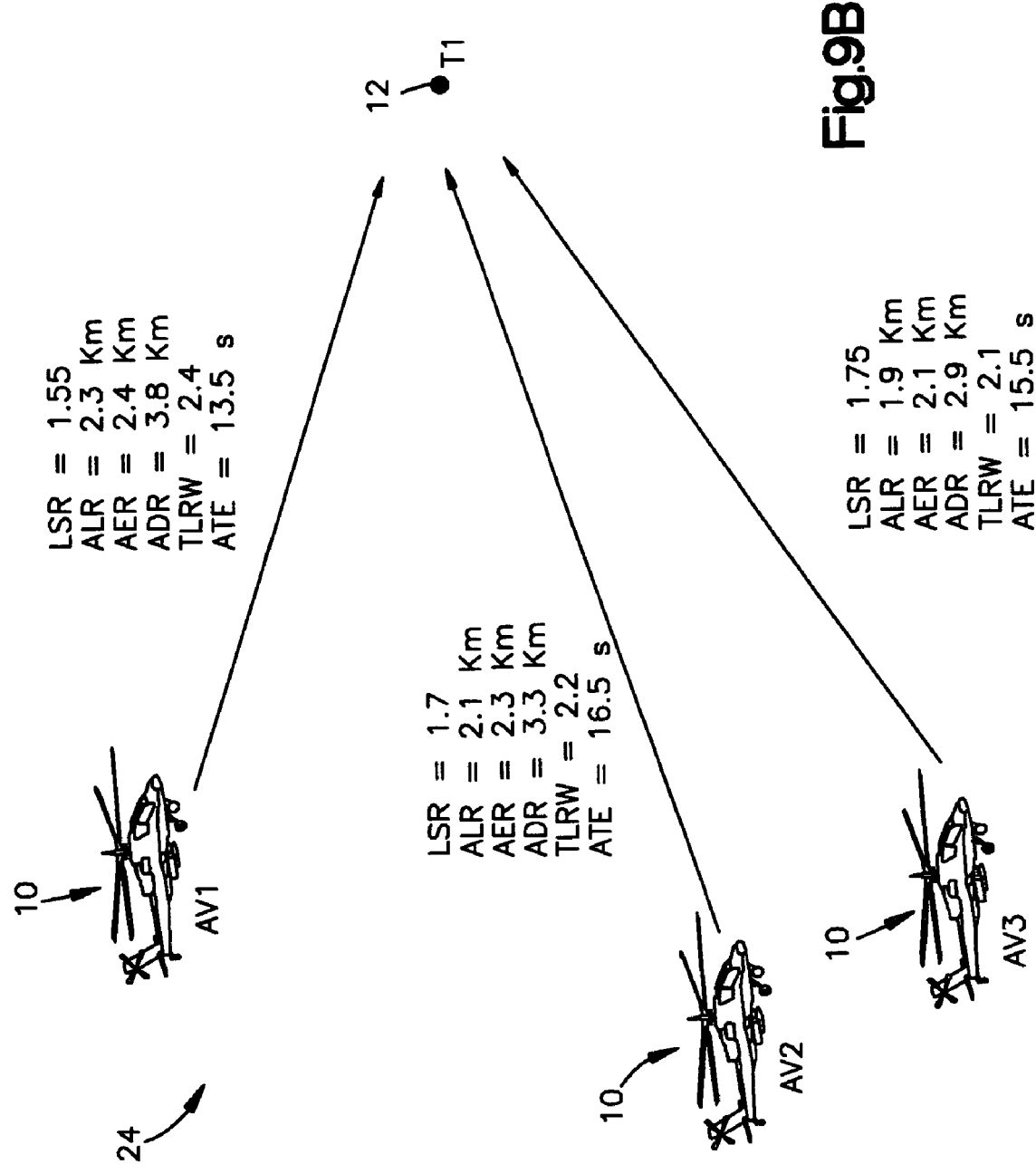

Examples of the suggestions provided by the attack planning system 60 are illustrated in FIGS. 9A-9C. FIGS. 9A-9C illustrate different battlefield engagement scenarios involving a team 24 including multiple attack vehicles 10.

Referring to FIG. 9A, a team 24 of three attack vehicles 10, identified at AV1, AV2, and AV3, are shown in a battlefield engagement scenario involving a single target 12, identified at T1. During the course of the engagement scenario, values for LSR, ALR, AER, ADR, TLRW, and ATE are determined for each attack vehicle 10 by their respective attack planning systems. These values are shown in FIG. 9A and change/update in real-time as the scenario evolves.

FIG. 9A illustrates a best initial situation attack solution. This attack solution allows for an immediate determination of which attack vehicle 10 of the team 24 has the most advantageous overall situation with respect to the target 12. In FIG. 9A, the attack vehicle 10 having the most advantageous overall situation with respect to the target 12 is AV3. This is because AV3 has the highest LSR (1.7) versus the target 12. Thus, in FIG. 9A, the attack solution is to suggest that AV3 engage the target 12. This suggestion is communicated to all three attack vehicles 10.

Referring to FIG. 9B, a team 24 of three attack vehicles 10, identified at AV1, AV2, and AV3, are shown in a battlefield engagement scenario involving a single target 12, identified at T1. During the course of the engagement scenario, values for LSR, ALR, AER, ADR, TLRW, and ATE are determined for each attack vehicle 10 by their respective attack planning systems. These values are shown in FIG. 9B and change/update in real-time as the scenario evolves.

FIG. 9B illustrates a best immediate solution attack solution. This attack solution allows for an immediate determination of which attack vehicle 10 of the team 24 can most immediately get into the best situation with respect to the target 12. This attack solution may be desirable, for example, where the attack vehicles 10 may encounter different terrains in engaging the target 12. In FIG. 9B, the attack vehicle 10 that can most immediately get into the best situation with respect to the target 12 is AV2. This is because AV2 has the highest LSR (1.7) and the longest ATE (16.5 seconds) versus the target 12. AV2 thus has an overall engagement advantage and a relatively long time to act. Thus, in FIG. 9B, the attack solution is to suggest that AV3 engage the target 12. This suggestion is communicated to all three attack vehicles 10.

Referring to FIG. 9C, a team 24 of three attack vehicles 10, identified at AV1, AV2, and AV3, are shown in a battlefield engagement scenario involving four different targets 12, identified at T1, T2, T3, and T4. During the course of the engagement scenario, values for LSR, ALR, AER, ADR, TLRW, and ATE are determined for each attack vehicle 10 with respect to each target 12 by their respective attack planning systems. These values (not shown) change/update in real-time as the scenario evolves.

FIG. 9C illustrates an adaptive target choice optimization attack solution. This attack solution determines an attack solution based on the overall advantage of each attack vehicle 10 against each target 12. In FIG. 9C, the attack solution suggests that each attack vehicle 10 engage the target 12 against which it has the best overall advantage. As indicated by the bold lines in FIG. 9C, AV1 is best suited to engage T1, AV2 is best suited to engage either T2 or T3, and AV3 is best suited to engage either T3 or T4. These suggestions are communicated to all three attack vehicles 10.

It will be appreciated that the description of the present invention set forth above is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, I claim:

1. A system for suggesting a course of action for a vehicle engaged in a situation, the system comprising:
    a portion configured to identify condition data that corresponds to conditions sensed from the situation, the condition data including at least an associated type of a target, a location of the target, a first vehicle parameter representing a first, substantially fixed, property of the vehicle, and a second vehicle parameter representing a second, adjustable, property of the vehicle;
    a portion configured to select an optimal value for a fitness parameter from a multi-dimensional model, in which a first dimension of the multi-dimensional model represents the target type, a second dimension of the multi-dimensional model represents the first vehicle parameter, and a third dimension of the multi-dimensional model represents the second vehicle parameter; and
    a behavioral logic portion configured to determine a suggested course of action for the vehicle based on the selected optimal value, the behavioral logic portion comprising a rule-based system for determining the suggested course of action from at least a portion of the condition data and the selected optimal value.

2. The system recited in claim 1, wherein the condition data comprises data stored in a look-up table.

3. The system recited in claim 1, wherein the multi-dimensional model is populated through simulation.

4. The system recited in claim 3, wherein the simulation comprises a stochastic simulation model.

5. The system recited in claim 3, wherein the simulation simulates scenarios defined by simulated condition data.

6. The system recited in claim 5, wherein the portion for identifying condition data comprises a portion for identifying simulated condition data that corresponds to the sensed conditions, and the portion for selecting parameters comprises a portion for selecting parameters associated with the identified simulated condition data.

7. The system recited in claim 1, wherein the sensed conditions comprise at least one of:
    a speed of the vehicle;
    an altitude of the vehicle;
    a vehicle aspect with respect to the target;
    an availability of weapons on the vehicle; and
    an availability of sensors on the vehicle.

8. The system recited in claim 1, wherein the fitness parameter comprises at least one of:
    a lethality standoff ratio;
    an average lethality range;
    an average engagement range;
    an average detection range;
    a target lethality relative weight; and
    an average time to engagement.

9. The system recited in claim 1, wherein the condition data comprises an average lethality range of a target, the behavior logic portion for determining a suggested course of action comprising:
    a portion for determining whether the vehicle is within the average lethality range of the target; and
    a portion for determining the suggested course of action in response to whether the vehicle is within the average lethality range of the target.

10. The system recited in claim 1, wherein the fitness parameter comprises a lethality standoff ratio for the vehicle versus a target, the behavioral logic portion for determining a suggested course of action being responsive to a determination of whether the lethality standoff ratio for the target is greater than one.

11. The system recited in claim 10, wherein the magnitude of the lethality standoff ratio is responsive to a determination of weapons available to the vehicle, sensors available to the vehicle, and an aspect angle of the vehicle with respect to the target.

12. The system recited in claim 10, wherein the portion for determining a suggested course of action comprises:
    a portion for determining an overall engagement advantage for the vehicle in response to a lethality standoff ratio greater than one; and
    a portion for determining an overall engagement disadvantage for the vehicle in response to a lethality standoff ratio less than one.

13. A computer readable medium, comprising executable instructions, configured to suggest a course of action for a vehicle engaged in a situation, the executable instructions comprising:
   an instruction configured to identify condition data that corresponds to conditions sensed from the situation, the condition data including at least an associated type of a target, a location of the target, a first vehicle parameter representing a first, substantially fixed, property of the vehicle, and a second vehicle parameter representing a second, adjustable, property of the vehicle;
   an instruction configured to select an optimal value for a fitness parameter from a multi-dimensional model, in which a first dimension of the multi-dimensional model represents the target type, a second dimension of the multi-dimensional model represents the first vehicle parameter, and a third dimension of the multi-dimensional model represents the second vehicle parameter; and
   an instruction configured to determine a suggested course of action for the vehicle based on the selected optimal value, the behavioral logic portion comprising a rule-based system for determining the suggested course of action from at least a portion of the condition data and the selected optimal value.

14. The computer program product recited in claim 13, wherein the condition data comprises data stored in a look-up table.

15. The computer program product recited in claim 13, wherein the multi-dimensional model is populated by simulation.

16. The computer program product recited in claim 15, wherein the simulation comprises a stochastic simulation model.

17. The computer program product recited in claim 15, wherein the simulation simulates scenarios defined by simulated conditions.

18. The computer program product recited in claim 17, wherein the instruction for identifying condition data comprises an instruction for identifying simulated condition data that corresponds to the sensed conditions, and the instruction for selecting parameters comprises an instruction for selecting parameters associated with the identified simulated condition data.

19. The computer program product recited in claim 13, wherein the sensed conditions comprise at least one of:
   a speed of the vehicle;
   an altitude of the vehicle;
   a vehicle aspect with respect to the target;
   an availability of weapons on the vehicle; and
   an availability of sensors on the vehicle.

20. The computer program product recited in claim 13, wherein the fitness parameter comprises comprise at least one of:
   a lethality standoff ratio;
   an average lethality range;
   an average engagement range;
   an average detection range;
   a target lethality relative weight; and
   an average time to engagement.

21. The computer program product recited in claim 13, wherein the condition data comprises an average lethality range of a target, the instruction for determining a suggested course of action comprising:
   an instruction for determining whether the vehicle is within the average lethality range of the target; and
   an instruction for determining the suggested course of action in response to whether the vehicle is within the average lethality range of the target.

22. The computer program product recited in claim 13, wherein the fitness parameter comprises a lethality standoff ratio for the vehicle versus a target, the instruction for determining a suggested course of action being responsive to a determination of whether the lethality standoff ratio for the target is greater than one.

23. The computer program product recited in claim 22, wherein the magnitude of the lethality standoff ratio is responsive to a determination of weapons available to the vehicle, sensors available to the vehicle, and an aspect angle of the vehicle with respect to the target.

24. The computer program product recited in claim 22, wherein the instruction for determining a suggested course of action comprises:
   an instruction for determining an overall engagement advantage for the vehicle in response to a lethality standoff ratio greater than one; and
   an instruction for determining an overall engagement disadvantage for the vehicle in response to a lethality standoff ratio less than one.

* * * * *